(12) United States Patent
Zeng

(10) Patent No.: US 10,825,174 B2
(45) Date of Patent: Nov. 3, 2020

(54) BREAST IMAGE ANALYSIS METHOD, BREAST IMAGE ANALYSIS SYSTEM, AND NON-TRANSITORY COMPUTER-READABLE MEDIUM

(71) Applicant: INSTITUTE FOR INFORMATION INDUSTRY, Taipei (TW)

(72) Inventor: Yi-Chong Zeng, Keelung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 129 days.

(21) Appl. No.: 16/188,319

(22) Filed: Nov. 13, 2018

(65) Prior Publication Data

US 2020/0111211 A1    Apr. 9, 2020

(30) Foreign Application Priority Data

Oct. 8, 2018    (TW) .............................. 107135445 A

(51) Int. Cl.
*G06K 9/00* (2006.01)
*A61B 6/04* (2006.01)
(Continued)

(52) U.S. Cl.
CPC .......... *G06T 7/0014* (2013.01); *G06K 9/6202* (2013.01); *G06K 9/6257* (2013.01);
(Continued)

(58) Field of Classification Search
USPC ........ 382/100, 103, 106, 128–134, 154–155, 382/162, 168, 173, 181–219, 220, 222,
(Continued)

(56) References Cited

U.S. PATENT DOCUMENTS

| 6,996,549 B2 * | 2/2006 | Zhang | ................... G06K 9/623 |
| | | | 706/16 |
| 2010/0266179 A1* | 10/2010 | Ramsay | ............... G06T 7/0012 |
| | | | 382/131 |
| 2011/0013819 A1* | 1/2011 | Raundahl | ............... G06K 9/527 |
| | | | 382/132 |
| 2011/0176710 A1* | 7/2011 | Mattiuzzi | ................. G06T 7/48 |
| | | | 382/128 |

(Continued)

OTHER PUBLICATIONS

Jose Celaya-Padilla et al "Bilateral Image Subtraction and Multivariate Models for the Automated Triaging of Screening Mammograms" Jun. 15, 2015.*

(Continued)

*Primary Examiner* — Seyed H Azarian
(74) *Attorney, Agent, or Firm* — CKC & Partners Co., LLC

(57) ABSTRACT

A breast image analysis method, breast image analysis system and non-transitory computer-readable medium are provided in this disclosure. The breast image analysis method includes the following operations: inputting a first breast image and a second breast image; extracting a plurality of first feature points of the first breast image and a plurality of second feature points of the second breast image; calibrating the first breast image and the second breast image according to the first feature points and the second feature points to generate a first calibration image and a second calibration image; calculating a first difference image and calculating a second difference image; utilizing an image analysis model to respectively determine whether the first difference image and the second difference image are symmetric; and generating an analysis report representing a symmetry result or an asymmetry result.

13 Claims, 15 Drawing Sheets

(51) Int. Cl.
    *G06T 7/00*         (2017.01)
    *G06T 7/68*         (2017.01)
    *G06T 7/13*         (2017.01)
    *G06K 9/62*        (2006.01)
    *G06T 7/11*         (2017.01)

(52) U.S. Cl.
    CPC ................. *G06T 7/11* (2017.01); *G06T 7/13* (2017.01); *G06T 7/68* (2017.01); *G06K 2009/6213* (2013.01); *G06T 2207/20081* (2013.01); *G06T 2207/20224* (2013.01); *G06T 2207/30068* (2013.01)

(58) Field of Classification Search
    USPC ....... 382/254, 274, 276, 285–291, 305, 312; 378/4, 21, 37; 706/16
    See application file for complete search history.

(56) References Cited

U.S. PATENT DOCUMENTS

2018/0165809 A1\*   6/2018  Stanitsas ............... G06T 7/0012

OTHER PUBLICATIONS

José Celaya-Padilla et al., "Bilateral Image Subtraction and Multivariate Models for the Automated Triaging of Screening Mammograms", Hindawi Publishing Corporation BioMed Research International vol. 2015, Article ID 231656, 12 pages, http://dx.doi.org/10.1155/2015/231656, Jun. 15, 2015.

The office action of the corresponding Taiwan application dated Apr. 10, 2019.

\* cited by examiner

S320

┌─────────────────────────────────────────────────────────────┐
│ Utilizing a first threshold to find a first edge of a first breast region, │
│ and utilizing the first threshold to find a second edge of a second │ ~S321
│ breast region │
└─────────────────────────────────────────────────────────────┘
                              ↓
┌─────────────────────────────────────────────────────────────┐
│ Calculating curvatures of pixels of the first edge and curvatures │ ~S322
│ of pixels of the second edge │
└─────────────────────────────────────────────────────────────┘
                              ↓
┌─────────────────────────────────────────────────────────────┐
│ Determining whether curvatures corresponding to pixels of the │
│ first edge and curvatures corresponding to pixels of the second │ ~S323
│ edge are larger than a second threshold, respectively; labeling │
│ pixels of the first edge that the curvatures corresponding to │
│ pixels are larger than the second threshold as the first feature │
│ points, and labeling pixels of the second edge that the curvatures │
│ corresponding to pixels are larger than the second threshold as │
│ the second feature points │
└─────────────────────────────────────────────────────────────┘

Fig. 5

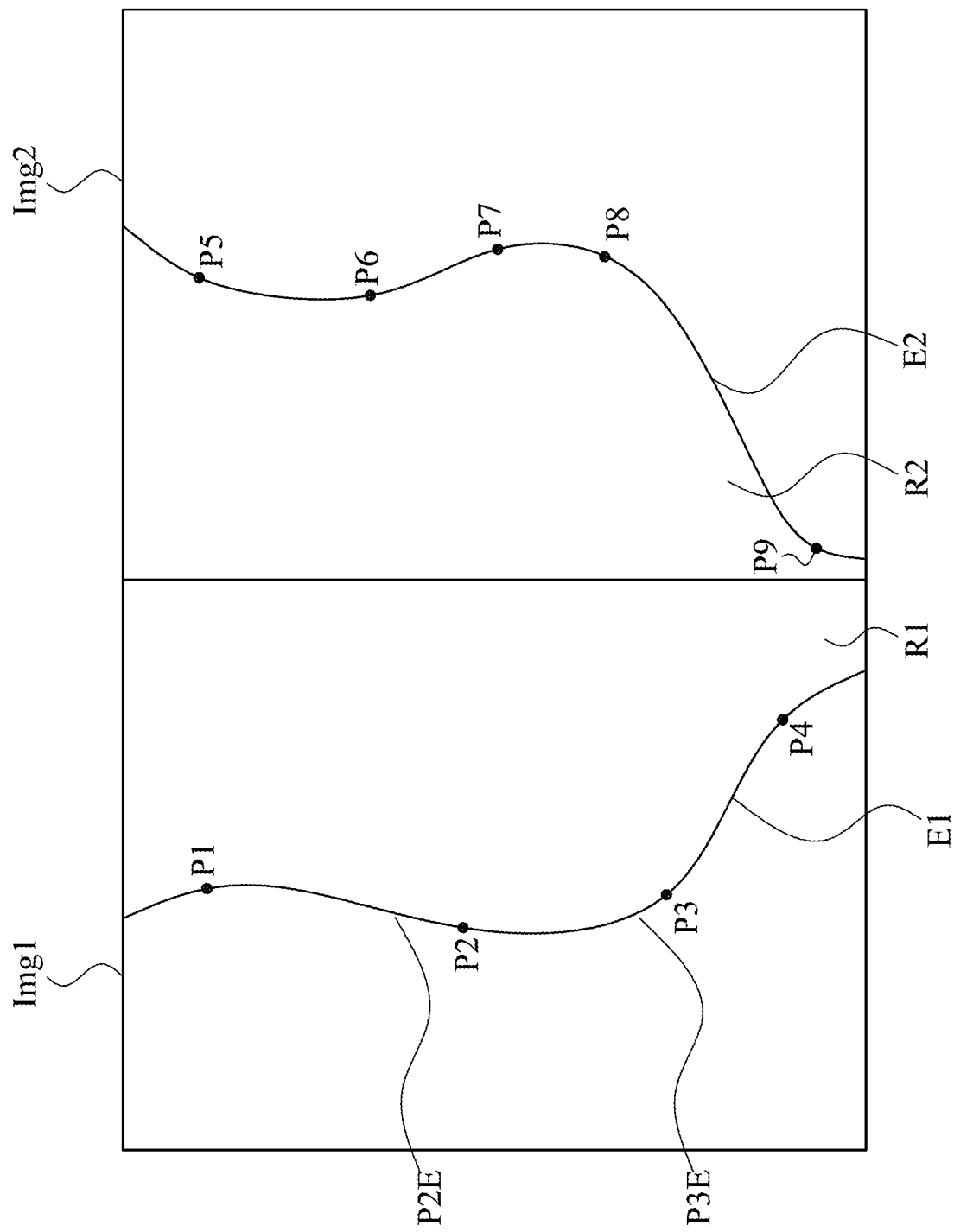

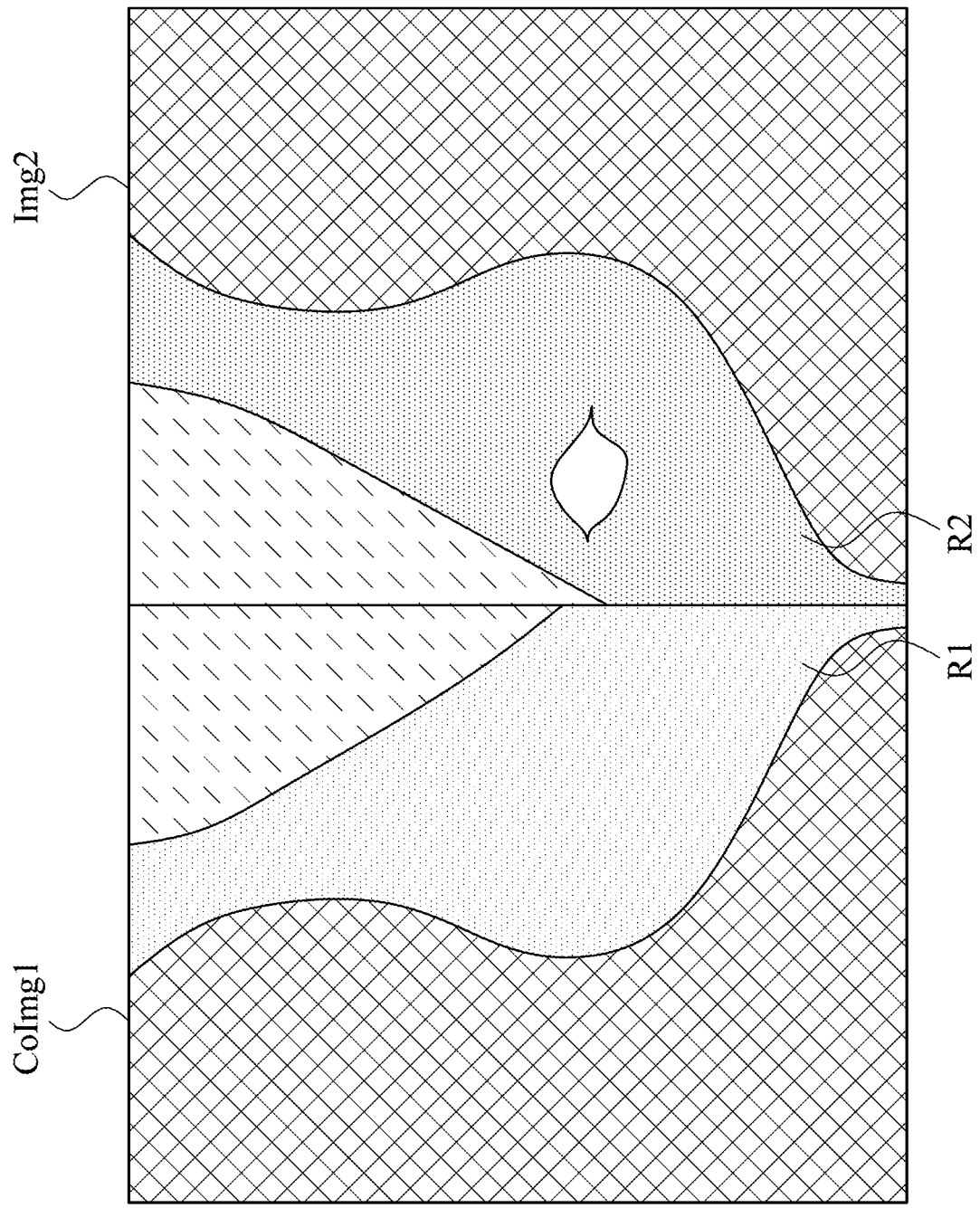

BREAST IMAGE ANALYSIS METHOD, BREAST IMAGE ANALYSIS SYSTEM, AND NON-TRANSITORY COMPUTER-READABLE MEDIUM

CROSS-REFERENCE TO RELATED APPLICATION

This application claims priority to Taiwanese Application Serial Number 107135445, filed on Oct. 8, 2018, which is herein incorporated by reference.

BACKGROUND

Field of Invention

The present application relates to an image processing method, image processing system and non-transitory computer-readable medium. More particularly, the present application relates to a breast image analysis method, breast image analysis system and non-transitory computer-readable medium.

Description of Related Art

The mammography technique mainly uses low-dose X-rays to examine human breasts, which can detect lesions such as masses or calcifications. The mammography technique is more accurate than the palpation method to find the type and location of the lesion in the breast. Therefore, the mammography images play an important role in breast cancer screening. However, persons with specialized medical knowledge are required to determine whether the mammography image has lesions or asymmetry regions of breast, the method of manual judgment would consume a lot of manpower and time, and the accuracy of manual judgment has a huge variation. Therefore, an image analysis method for determining automatically whether the mammography image is symmetric and further determining the asymmetry region within the mammography image is required.

SUMMARY

An aspect of the disclosure is to provide a breast image analysis method. The breast image analysis method includes operations of: inputting a first breast image and a second breast image; extracting a plurality of first feature points of the first breast image and a plurality of second feature points of the second breast image; calibrating the first breast image and the second breast image according to the first feature points and the second feature points to generate a first calibration image and a second calibration image; calculating a first difference image between the first breast image and the second calibration image and calculating a second difference image between the second breast image and the first calibration image; utilizing an image analysis model to respectively determine whether the first difference image and the second difference image are symmetric, wherein, when the first difference image and the second difference image are symmetric, to generate a symmetry result; when the first difference image and the second difference image are asymmetric, to generate an asymmetry result; and generating an analysis report representing the symmetry result or the asymmetry result.

Another aspect of the disclosure is to provide a breast image analysis system. The breast image analysis system includes a storage device, a processor and a displayer. The processor is electrically connected to the storage device. The storage device is configured to store a first breast image and a second breast image. The displayer is configured to display an analysis report. The processor includes a feature extraction unit, an image calibration unit, a difference image generation unit, a symmetry analysis unit, a report generation unit and an analysis model establishing unit. The feature extraction unit is configured for extracting a plurality of first feature points of the first breast image and a plurality of second feature points of the second breast image. The image calibration unit is electrically connected to the feature extraction unit, and configured for calibrating the first breast image and the second breast image according to the first feature points and the second feature points to generate a first calibration image and a second calibration image. The difference image generation unit is electrically connected to the image calibration unit, and configured for calculating a first difference image between the first breast image and the second calibration image and calculating a second difference image between the second breast image and the first calibration image. The symmetry analysis unit is electrically connected to the difference image generation unit and the analysis model establishing unit, and configured for utilizing an image analysis model to respectively determine whether the first difference image and the second difference image are symmetric, wherein, when the first difference image and the second difference image are symmetric, to generate a symmetry result; when the first difference image and the second difference image are asymmetric, to generate an asymmetry result. The report generation unit, is electrically connected to the symmetry analysis unit, and configured for generating the analysis report representing the symmetry result or the asymmetry result.

Another aspect of the disclosure is to provide a non-transitory computer-readable medium including one or more sequences of instructions to be executed by a processor for performing a breast image analysis method, wherein the method includes operations of: inputting a first breast image and a second breast image; extracting a plurality of first feature points of the first breast image and a plurality of second feature points of the second breast image; calibrating the first breast image and the second breast image according to the first feature points and the second feature points to generate a first calibration image and a second calibration image; calculating a first difference image between the first breast image and the second calibration image and calculating a second difference image between the second breast image and the first calibration image; utilizing an image analysis model to respectively determine whether the first difference image and the second difference image are symmetric, wherein, when the first difference image and the second difference image are symmetric, to generate a symmetry result; when the first difference image and the second difference image are asymmetric, to generate an asymmetry result; and generating an analysis report representing the symmetry result or the asymmetry result.

Based on aforesaid embodiments, breast image analysis method, breast image analysis system and non-transitory computer-readable medium are capable of extracting feature points of the paired breast images to calibrate the paired breast images; calculating the breast difference images of the breast paired images; inputting the breast difference image into classifier to train the image analysis model; and then determining whether the breast image is symmetric according the trained image analysis model, if the breast image is asymmetric, calculating an asymmetry region of the breast image. In some embodiments, this disclosure is able to determine automatically the breast image is asymmetric and detect the asymmetry region of the breast image.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is a flow diagram illustrating step S320 according to an embodiment of this disclosure.

FIG. 6A is a schematic diagram illustrating the edge of the paired breast images according to an embodiment of this disclosure.

FIG. 8C is a schematic diagram illustrating the second breast image and the first calibration image according to an embodiment of this disclosure.

DETAILED DESCRIPTION

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
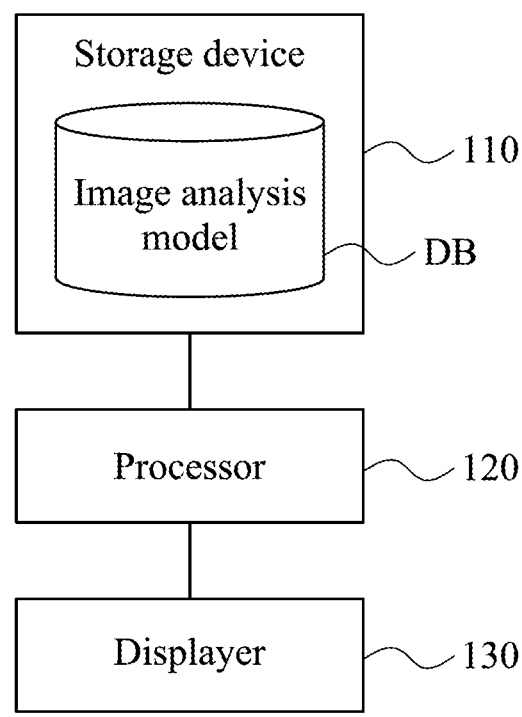
FIG. 1 is a functional block diagram illustrating a breast image analysis system according to an embodiment of the disclosure.

Reference is made to FIG. 1, which is a functional block diagram illustrating a breast image analysis system 100 according to an embodiment of the disclosure. As shown in FIG. 1, the breast image analysis system 100 includes a storage device 110, a processor 120 and a displayer 130. The processor is electrically connected to the storage device 110 and the displayer 130. The storage device 110 is configured to store paired breast images and an image analysis model DB, and the paired breast images include a first breast image and a second breast image. In some embodiments, the paired breast images can be realized to the left breast image and the right breast image taken at the same time, or the right breast images (or the left breast images) taken at the different time. The displayer 130 is configured to display the breast image after the asymmetry judgement or the analysis report. The processor 120 is configured to determine whether the paired breast images are symmetric, if the breast image is asymmetric, calculating an asymmetry region of the breast image.

In the embodiments of the disclosure, the processor 120 can be implemented by a microcontroller, a microprocessor, a digital signal processor, an application specific integrated circuit, a central processing unit, a control circuit and/or a graphics processing unit. The storage device 110 can be implemented by a memory, a hard disk, a flash drive, a memory card, etc.

Figure 2:
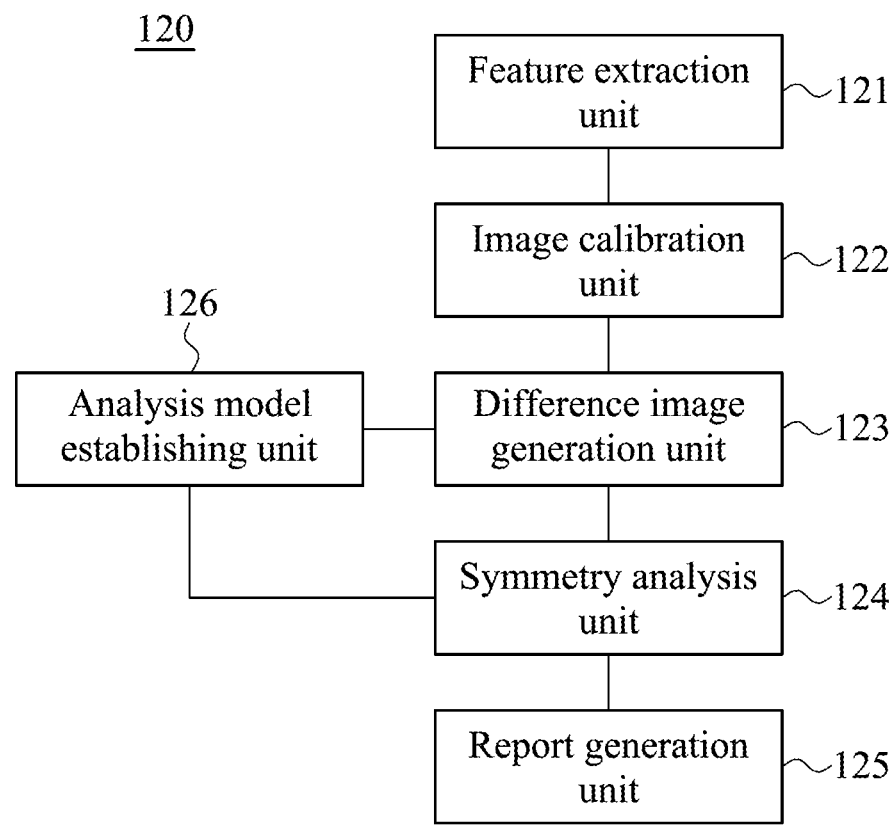
FIG. 2 is a functional block diagram illustrating a processor according to an embodiment of the disclosure.

Reference is made to FIG. 2, which is a functional block diagram illustrating a processor 120 according to an embodiment of the disclosure. As shown in FIG. 2, the processor 120 includes a feature extraction unit 121, an image calibration unit 122, a difference image generation unit 123, symmetry analysis unit 124, a report generation unit 125, and an analysis model establishing unit 126. The image calibration unit 122 is electrically connected to the feature extraction unit 121 and the difference image generation unit 123. The symmetry analysis unit 124 is electrically connected to the difference image generation unit 123 and the report generation unit 125. The analysis model establishing unit 126 is electrically connected to the difference image generation unit 123 and the symmetry analysis unit 124. The symmetry analysis unit 124 is configured to analyze the paired breast images according to the image analysis model DB generated by the analysis model establishing unit 126.

Figure 3:
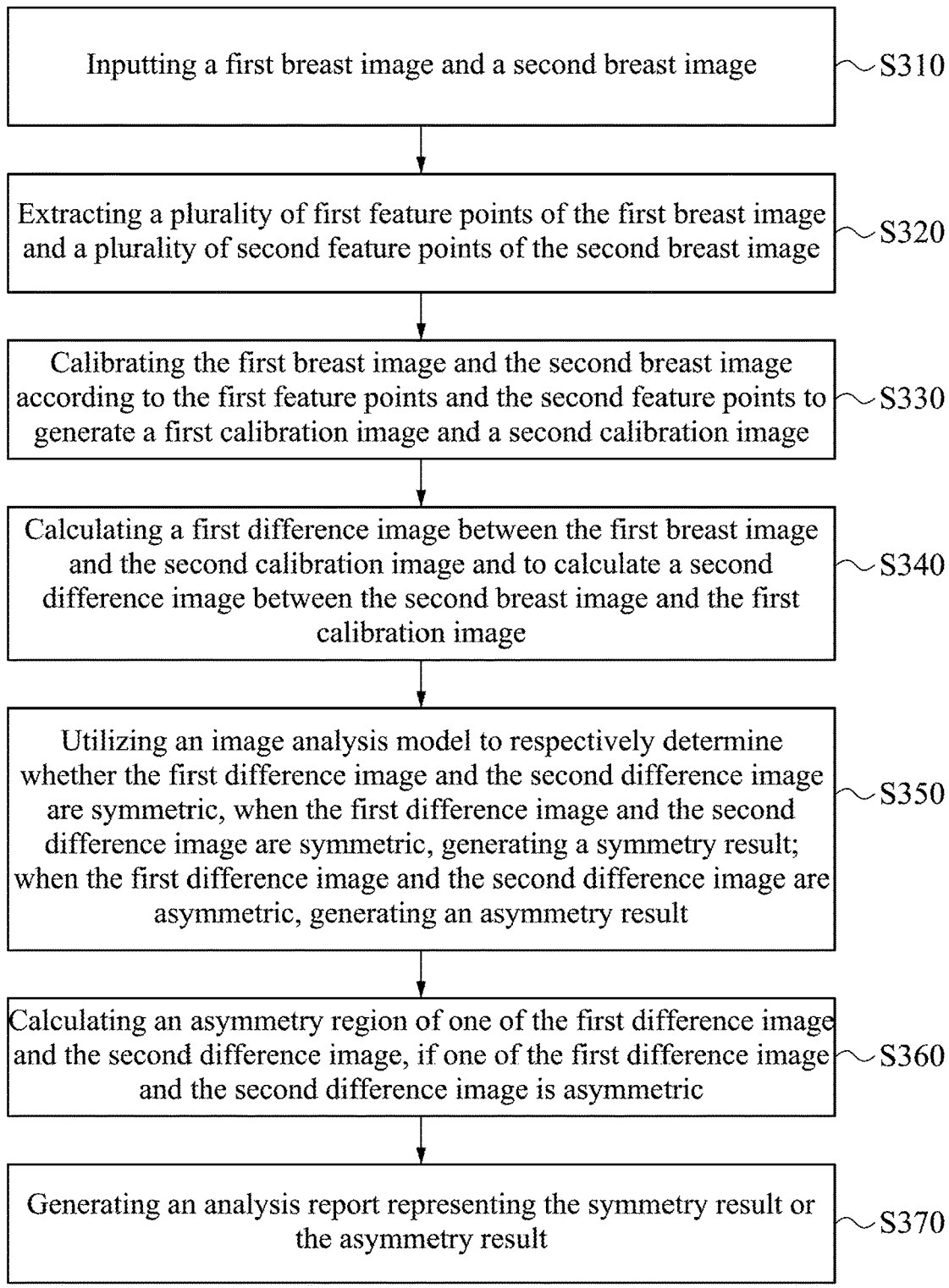
FIG. 3 is a flow diagram illustrating a breast image analysis method according to an embodiment of this disclosure.

Reference is made to FIG. 3, which is a flow diagram illustrating a breast image analysis method 300 according to an embodiment of this disclosure. In the embodiment, the breast image analysis method 300 can be applied to the breast image system 100 of FIG. 1. The processor can be utilized to determine whether the breast image is symmetric, if the breast image is asymmetric, calculating an asymmetry region of the breast image.

Figure 4:
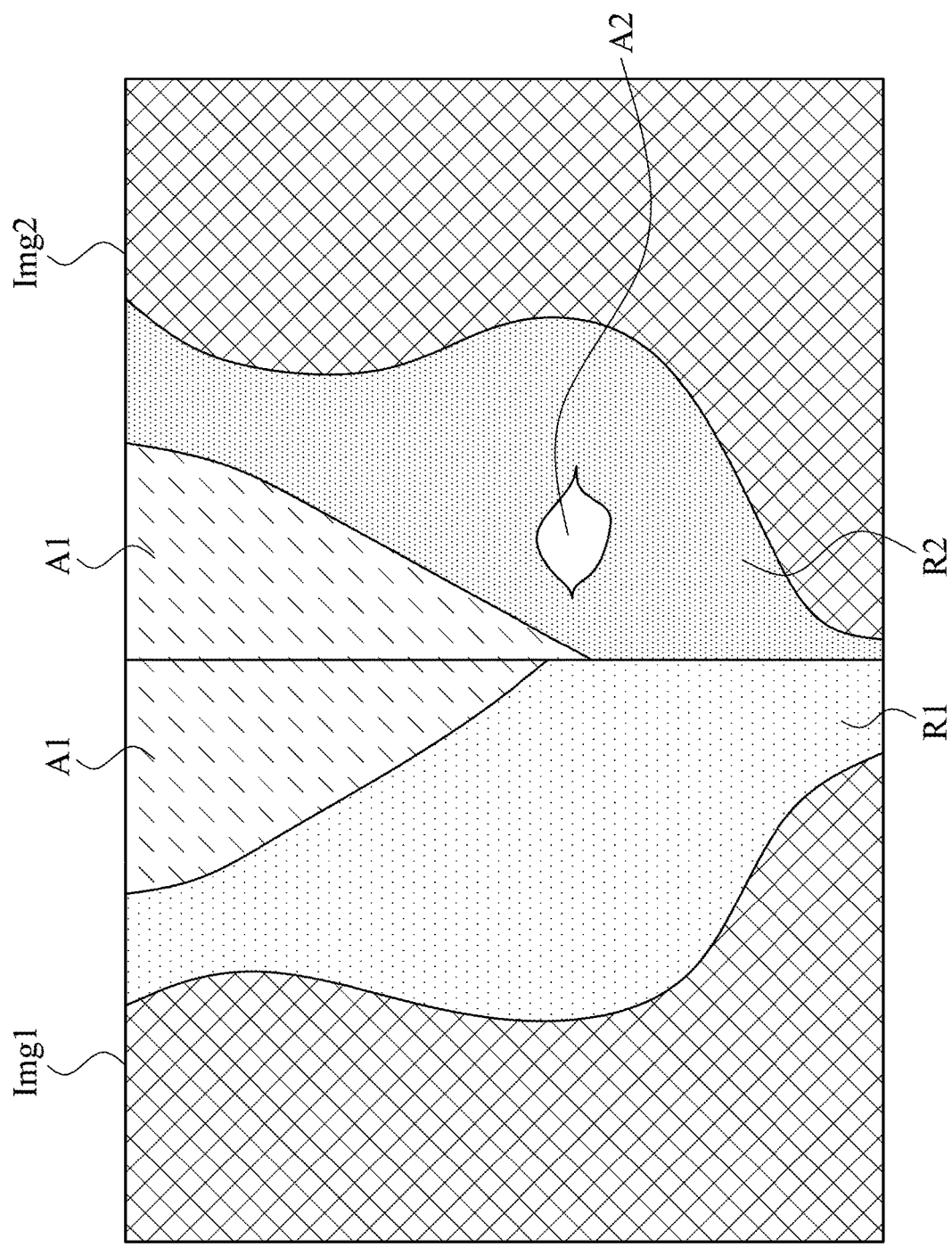
FIG. 4 is a schematic diagram illustrating the paired breast images according to an embodiment of this disclosure.

Reference is made to FIG. 4, which is a schematic diagram illustrating the paired breast images according to an embodiment of this disclosure. The breast image analysis method 300 firstly executes step S310 to input a first breast image Img1 and a second breast image Img2. When the asymmetry detection of the breast image is performed, the paired breast images are inputted at the same time, wherein the first breast image Img1 includes a breast region R1 and the second breast image Img2 includes a breast region R2. As shown in FIG. 4, the breast region R1 and R2 includes mammary gland, adipose tissue (not shown in figures), muscle tissue (as shown in region A1 of FIG. 4), and lesion (as shown in region A2 of FIG. 4). The region A2 has a higher brightness values in the mammography images. The breast region R1 is represented by a with low density dot (i.e. ".") in FIG. 4, and the breast region R2 is represented by a with high density dot (i.e. ".") in FIG. 4. The background region (represented by a "net" in FIG. 4) other than the breast region R1 and R2 is the black region, and the background region has a lower brightness values in the mammography images.

Afterwards, the breast image analysis method 300 executes step S320 to extract a plurality of first feature points of the first breast image Img1 and a plurality of second feature points of the second breast image Img2. The step S320 further includes steps S321~S323, reference is made to FIG. 5 and FIG. 6A. FIG. 5 is a flow diagram illustrating step S320 according to an embodiment of this disclosure, and FIG. 6A is a schematic diagram illustrating the edge of the paired breast images according to an embodiment of this disclosure. As the embodiment shown in FIG. 5, the breast image analysis method 300 further executes step S321 to utilize a first threshold to find a first edge E1 of a first breast region R1, and to utilize the first threshold to find a second edge E2 of a second breast region R2. As shown in FIG. 6A, the gray value of pixels in the first breast image Img1 are filtered by utilizing the first threshold, and the pixels which gray values is larger than the first threshold are the pixel of the breast region R1 In general case, the mammography image includes background region and breast region, and the background region is composed of pixels with lower gray values. Therefore, pixels of the breast region R1 and R2 can be filtered by utilizing the first threshold. Afterwards, after finding the pixels of the breast region R1, labeling pixels adjacent to the background region in the breast region R1 as pixels of the first edge E1. For similar reason, the pixels of the second edge E2 of the second breast Img2 can be found by aforesaid processing.

Afterwards, the breast image analysis method 300 further executes step S322 to calculate curvatures of pixels of the first edge E1 and curvatures of pixels of the second edge E2. In the embodiment, as shown in FIG. 6A, it is assumed that the first edge E1 and the second edge E2 are composed of a plurality of pixels. A pixel set with length L is composed of the pixel P of the first edge E1 and adjacent pixels of the pixel P, and the pixel P is located at the center of the pixel set. The curvatures of the pixel P could be calculated by Formula 1. Wherein, the parameter x' is obtained by pixels of the pixel set performed the x-axis first order differential equation, and the parameter y' is obtained by pixels of the pixel set performed the y-axis first order differential equation. The parameter x" is obtained by pixels of the pixel set performed the x-axis second order differential equation, and the parameter y" is obtained by pixels of the pixel set performed the y-axis second order differential equation. For example, the four pixels P1, P2, P3 and P4 of the first edge E1 have corresponding curvatures c1, c2, c3 and c4, respectively. If the curve undergoes a tight turn, the curvature of the curve is large. For similar reason, the pixels P5, P6, P7 and P8 of the second edge E2 can be obtained by aforesaid curvatures calculating.

$$c = \frac{|x'y'' - x''y'|}{(x'^2 + y'^2)^{3/2}} \quad \text{(Formula 1)}$$

Figure 6B:
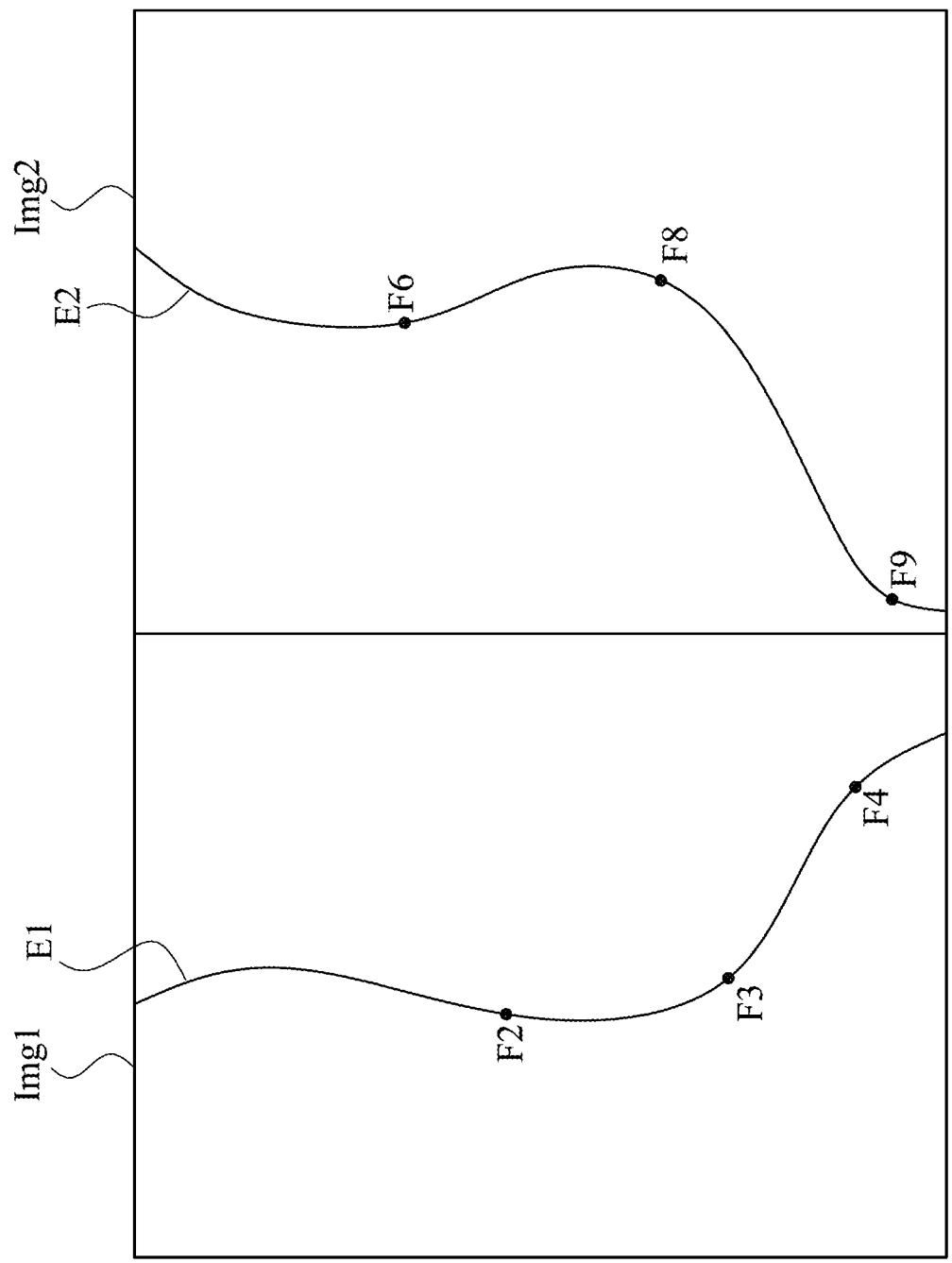
FIG. 6B is a schematic diagram illustrating the feature points of the edge of the paired breast images according to an embodiment of this disclosure.

Afterwards, the breast image analysis method 300 further executes step S323 to determine whether curvatures corresponding to pixels of the first edge E1 and curvatures corresponding to pixels of the second edge E2 are larger than a second threshold, respectively; labeling pixels of the first edge E1 that the curvatures corresponding to pixels are larger than the second threshold as the first feature points, and labeling pixels of the second edge E2 that the curvatures corresponding to pixels are larger than the second threshold as the second feature points. Reference is made to FIG. 6B, which is a schematic diagram illustrating the feature points of the edge of the paired breast images according to an embodiment of this disclosure. In the embodiment, the pixels with small curvature are filtered out by utilizing the second threshold, because the pixels with small curvature are usually a relatively flat curve. As shown in FIG. 6B, it is assumed that the curvatures corresponding to pixels P1, P5 and P7 are less than the second threshold. As a result, the pixels P1, P5, and P7 do not meet the condition of the feature point, and the pixels P2, P3 and P4 are the feature points of the first edge E1. Therefore, the first edge E1 has three features points F2, F3 and F4. For similar reason, the pixels P6, P8 and P9 are the feature points of the second edge E2. Therefore, the second edge E2 has three features points F6, F8 and F9.

Figure 7:
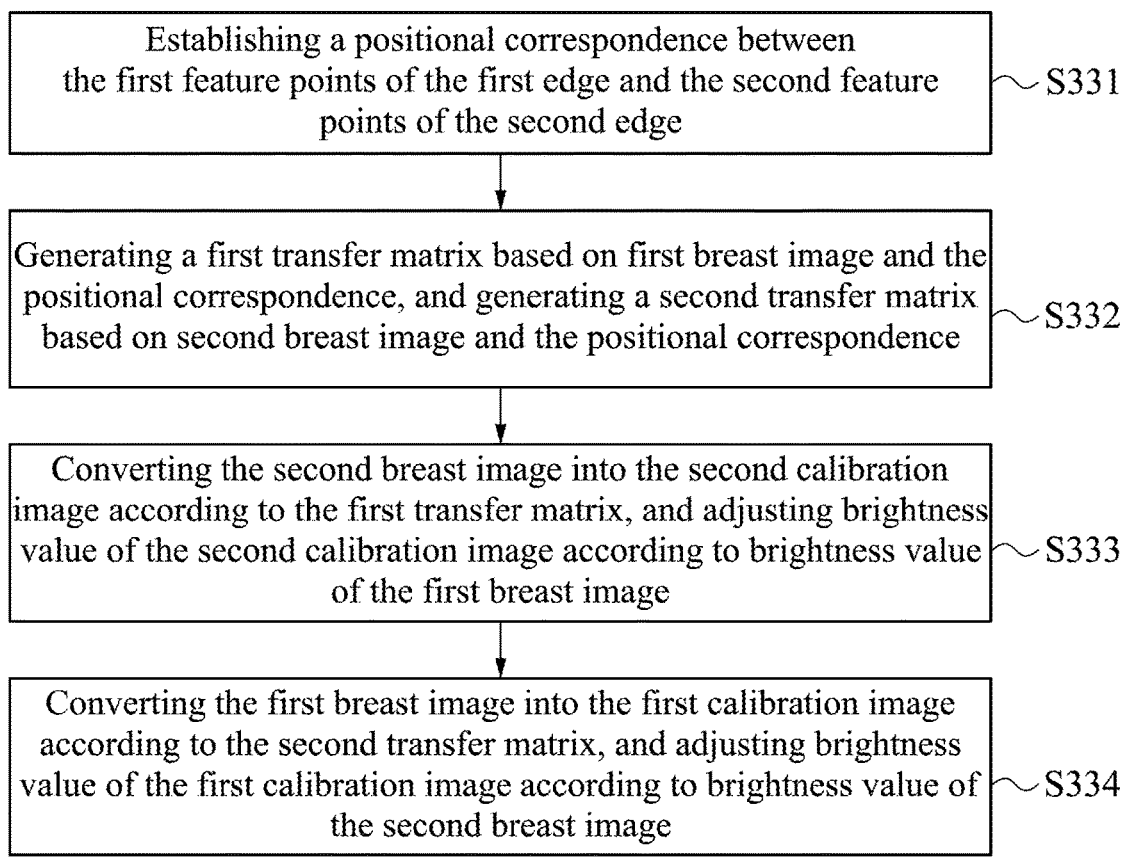
FIG. 7 is a flow diagram illustrating step S330 according to an embodiment of this disclosure.
Figure 8A:
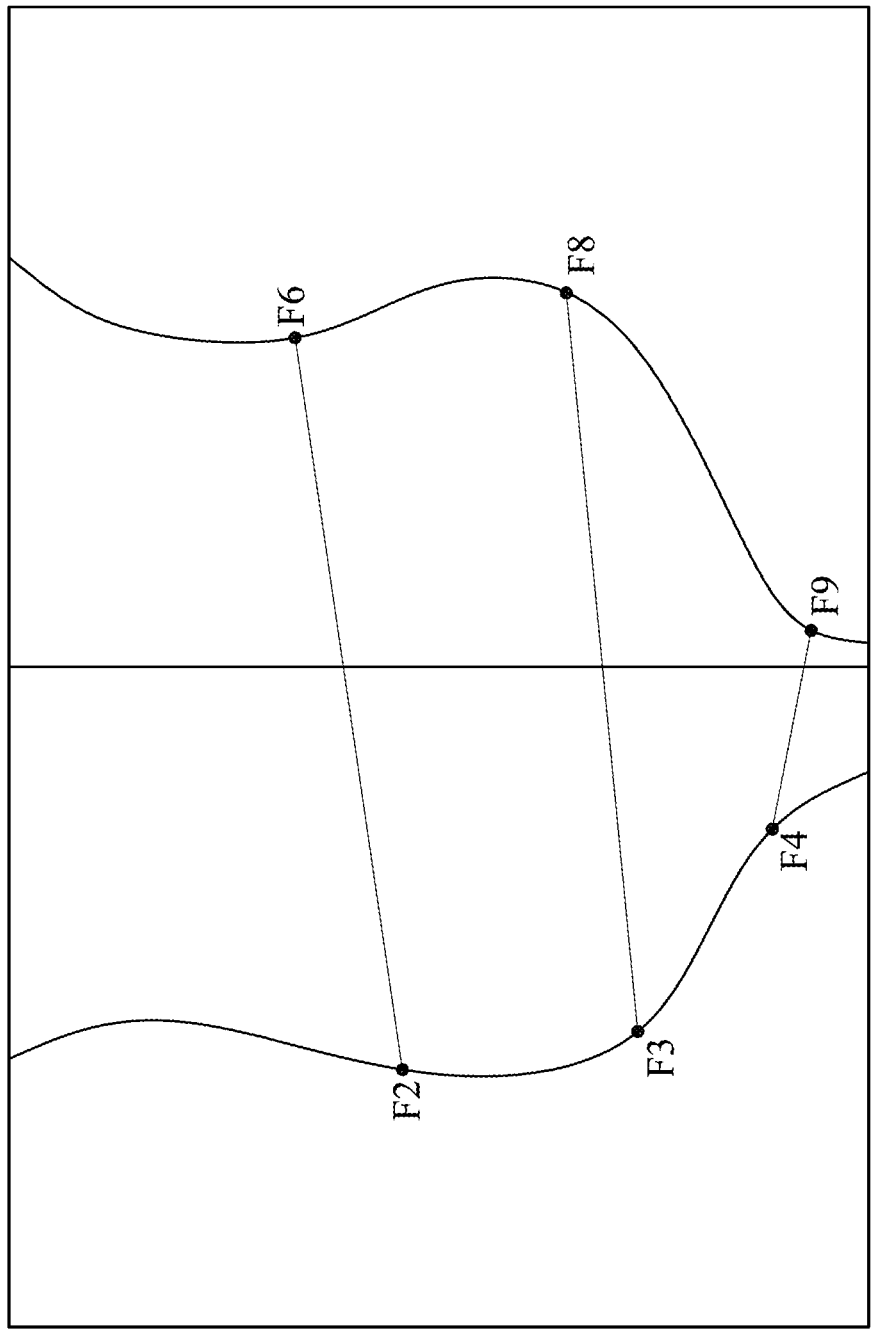
FIG. 8A is a schematic diagram illustrating the feature points correspondence according to an embodiment of this disclosure.

Afterwards, the breast image analysis method 300 further executes step S330 to calibrate the first breast image Img1 and the second breast image Img2 according to the first feature points and the second feature points to generate a first calibration image and a second calibration image. The step S330 further includes steps S331~S334, reference is made to FIG. 7 and FIG. 8A. FIG. 7 is a flow diagram illustrating step S330 according to an embodiment of this disclosure, and FIG. 8A is a schematic diagram illustrating the feature points correspondence according to an embodiment of this disclosure. The breast image analysis method 300 further executes step S331 to establish a positional correspondence between the first feature points F2, F3 and F4 of the first edge E1 and the second feature points F6, F8 and F9 of the second edge E2. In the embodiment, a cost matrix is calculated by the first feature points F2, F3, and F4 of the first edge E1 and the second feature points F6, F8, and F9 of the second edge E2. The cost matrix could be calculated by Formula 2. The parameter s(i, j) is cost coefficient; the parameter $c_1(i)$ is curvature of the i-th feature point of the first edge E1 and the parameter $c_2(j)$ is curvature of the j-th feature point of the second edge E2. In this case, the cost matrix between the first feature points F2, F3 and F4 of the first edge E1 and the second feature points F6, F8 and F9 of the second edge E2 is a 3 by 3 matrix. The first feature points F2, F3 and F4 of the first edge E1 are correspond to the second feature points F6, F8, and F9 of the second edge E2, respectively. Afterwards, as shown in FIG. 8A, it is utilized the dynamic time warping to search the shortest path of the cost matrix, the correlation between the first feature points F2, F3, and F4 of the first edge E1 and the second feature points F6, F8, and F9 of the second edge E2 is generated by the search result.

$$s(i,j)=|c_1(i)-c_2(j)| \quad \text{(Formula 2)}$$

Afterwards, the breast image analysis method 300 further executes step S332 to generate a first transfer matrix based on first breast image Img1 and the positional correspondence, and to generate a second transfer matrix based on second breast image Img2 and the positional correspondence. In the embodiment, after finding the positional correspondence between feature points, the transfer matrices of the first breast image Img1 and the second breast image Img2 are calculated by utilizing the positional correspondence. The transfer matrix could be calculated by Formula 3 and Formula 4, respectively. The parameter $(X_i, Y_i)$ is the coordinates of i-th feature point of the first edge E1 and the parameter $(U_j, V_j)$ is the coordinates of j-th feature point of the second edge E2. The first transfer matrix could be calculated by Formula 3, and for similar reason, the second transfer matrix could be calculated by Formula 4.

$$\begin{bmatrix} X_i \\ Y_i \\ Z_1 \end{bmatrix} = \begin{bmatrix} a_1 & b_1 & c_1 \\ d_1 & e_1 & f_1 \\ g_1 & h_1 & 1 \end{bmatrix} \begin{bmatrix} U_j \\ V_j \\ 1 \end{bmatrix} \quad \text{(Formula 3)}$$

$$\begin{bmatrix} U_j \\ V_j \\ Z_2 \end{bmatrix} = \begin{bmatrix} a_2 & b_2 & c_2 \\ d_2 & e_2 & f_2 \\ g_2 & h_2 & 1 \end{bmatrix} \begin{bmatrix} X_i \\ Y_i \\ 1 \end{bmatrix} \quad \text{(Formula 4)}$$

Figure 8B:
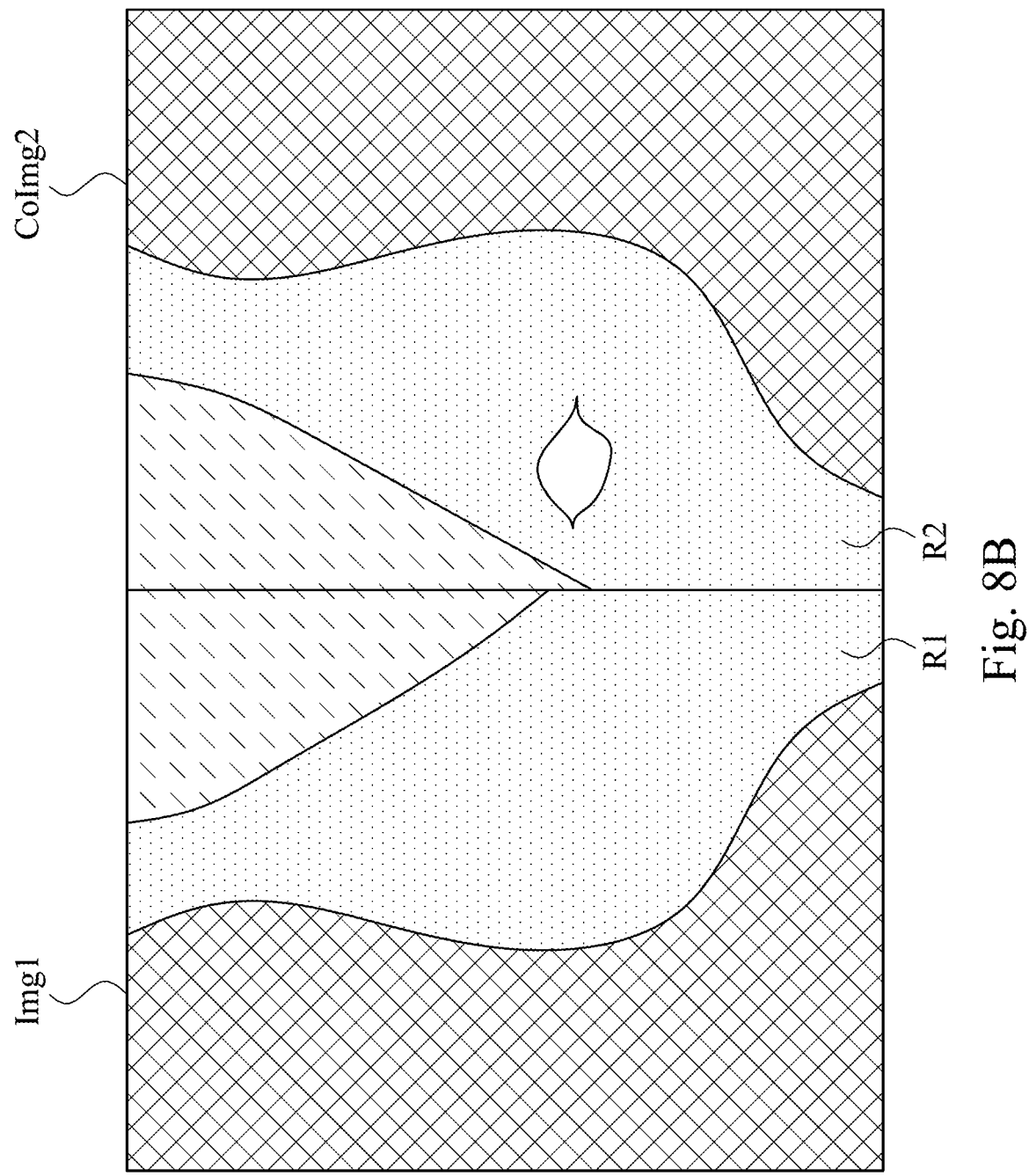
FIG. 8B is a schematic diagram illustrating the first breast image and the second calibration image according to an embodiment of this disclosure.

Afterwards, the breast image analysis method 300 further executes step S333 to convert the second breast image Img2 into the second calibration image CoImg2 according to the first transfer matrix, and to adjust brightness value of the second calibration image CoImg2 according to brightness value of the first breast image Img1. Reference is made to FIG. 8B. FIG. 8B is a schematic diagram illustrating the first breast image Img1 and the second calibration image CoImg2 according to an embodiment of this disclosure. As shown in FIG. 8B, after converting the second breast image Img2 into the second calibration image CoImg2 by utilizing the first transfer matrix, the shape of the breast region R2 of the second calibration image CoImg2 will be similar to the shape of the breast region R1 of the first breast image Img1.

In other words, the first transfer matrix and the second transfer matrix obtained in step S332 can adjust the shapes of the breast regions R1 and R2. Afterwards, brightness value of the second calibration image CoImg2 is adjusted by transfer function of histogram matching. As shown in FIG. 4 and FIG. 8B, before calibration calculating, the brightness of the second breast image Img2 (breast region R2) is darker than the first breast image Img1 (breast region R1). The breast region R2 of the second calibration image CoImg2 is performed the brightness equalization, and the brightness value of the breast region R2 of the second calibration image CoImg2 is similar to the brightness value of the breast region R1 of the first breast image Img1. That is, the brightness value of the breast region R2 is brightened. (the pixel values of the breast region R1 and R2 is represented by a with low density dot (i.e. ".") in FIG. 8B)

Afterwards, the breast image analysis method 300 further executes step S334 to convert the first breast image Img1 into the first calibration image CoImg1 according to the second transfer matrix, and to adjust brightness value of the first calibration image CoImg1 according to brightness value of the second breast image Img2. Reference is made to FIG. 8C. FIG. 8C is a schematic diagram illustrating the second breast image Img2 and the first calibration image CoImg1 according to an embodiment of this disclosure. As shown in FIG. 8C, after converting the first breast image Img1 into the first calibration image CoImg1 by utilizing the second transfer matrix, the shape of the breast region R1 of the first calibration image CoImg1 will be similar to the shape of the breast region R2 of the second breast image Img2. Afterwards, according to aforesaid embodiment, brightness value of the first calibration image CoImg1 is adjusted by transfer function of histogram matching. As shown in FIG. 4 and FIG. 8C, before calibration calculating, the brightness of the first breast image Img1 (breast region R1) is brighter than the second breast image Img2 (breast region R2). The breast region R1 of the first calibration image CoImg1 is performed the brightness equalization, and the brightness value of the breast region R1 of the first calibration image CoImg1 is similar to the brightness value of the breast region R2 of the second breast image Img2. That is, the brightness value of the breast region R1 is dimmed. (the pixel values of the breast region R1 and R2 is represented by a high density dot (i.e. ".") in FIG. 8C)

Afterwards, according to aforesaid embodiment, the brightness value and the shape of the breast region R1 of the first breast image Img1 is similar to the brightness value and the shape of the breast region R2 of the second calibration image CoImg2. The brightness value and the shape of the breast region R1 of the first calibration image CoImg1 is similar to the brightness value and the shape of the breast region R2 of the second breast image Img2. Because inconsistent brightness value and inconsistent shape between the breast region R1 and the breast region R2 will affect the accuracy of asymmetry judgment, the operation can be realized as reducing the difference between the breast region R1 and the breast region R2, so that it can be more accurate in the asymmetry judgement.

Figure 9:
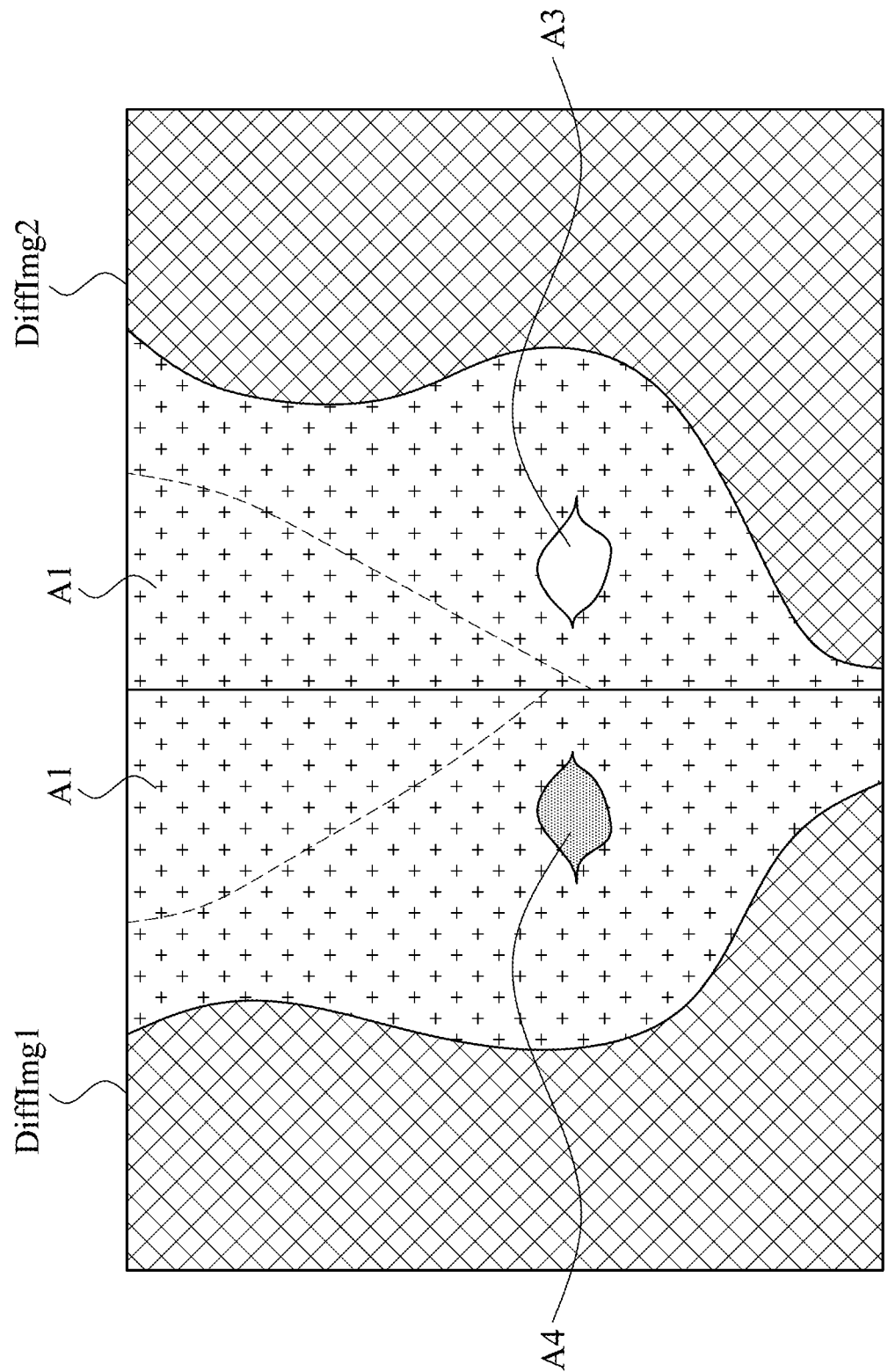
FIG. 9 is a schematic diagram illustrating the first difference image and the second difference image according to an embodiment of this disclosure.

Afterward, the breast image analysis method 300 executes step S340 to calculate a first difference image DiffImg1 between the first breast image Img1 and the second calibration image CoImg2 and to calculate a second difference image DiffImg2 between the second breast image Img2 and the first calibration image CoImg1. Reference is made to FIG. 4 and FIG. 9. FIG. 9 is a schematic diagram illustrating the first difference image DiffImg1 and the second difference image DiffImg2 according to an embodiment of this disclosure. In the embodiment, the first difference image DiffImg1 is generated by subtracting the pixel value of the second calibration image CoImg2 from the pixel value of the first breast image Img1. The second difference image DiffImg2 is generated by subtracting the pixel value of the first calibration image CoImg1 from the pixel value of the second breast image Img2. As the embodiment shown in FIG. 9, after the calculation of step S340, the feature of the region A1 of the first difference image DiffImg1 and the second difference image DiffImg2 will be nonobvious (represented by a "+" in FIG. 9). However, as shown in FIG. 4, the region A2 is belonged to the lesion region, and thus the regions A3 and A4 of the first difference image DiffImg1 and the second difference image DiffImg2 are still the obvious region. The difference between the region A3 (represented by "white background" in FIG. 9) and the region A4 (represented by "high density dot" in FIG. 9) is the difference in brightness of pixel values (because of the image is subtracted). The region A3 has brighter image brightness, and area A4 has darker image brightness.

Afterward, the breast image analysis method 300 executes step S350 to utilize an image analysis model DB to respectively determine whether the first difference image DiffImg1 and the second difference image DiffImg2 are symmetric, when the first difference image DiffImg1 and the second difference image DiffImg2 are symmetric, to generate a symmetry result; when the first difference image DiffImg1 and the second difference image DiffImg2 are asymmetric, to generate an asymmetry result. Before executing step S350, it is necessary to establish an image analysis model DB. The image analysis model DB is generated by the first difference image DiffImg1, the second difference image DiffImg2 and the corresponding labeling results.

Afterwards, after calculating the first difference image DiffImg1 and the second difference image DiffImg2, the first difference image DiffImg1 and the second difference DiffImg2 are respectively labeled to generate a first label result and a second label result. The label result can be realized as whether the breast image corresponding to the difference image is asymmetric, if the asymmetry condition is occurred, the label result is represented by "1". If the symmetry condition is occurred, the label result is represented by "0". The label result also can be expressed in other ways. For example, if the asymmetry condition is occurred, the label result is represented by "Y". If the symmetry condition is occurred, the label result is represented by "N", and the representation of the label result should not be limited by these terms. In this case, the second difference image DiffImg2 would be labeled as "1", and it is realized that the asymmetry condition is occurred in the second breast image Img2.

Afterwards, the first difference image DiffImg1, the second difference image DiffImg2, the first label result and the second label result are utilized as the training data to train the classifier. In the embodiment, the classifier can be trained by using a support vector machine (SVM), convolutional neural network (CNN), K-Nearest neighbor algorithm (KNN), etc. The trained analysis classifier can be as the image analysis model DB, which is utilized to automatically make asymmetry judgments for paired breast images. If a lot of training data can be inputted in the image analysis model DB, the image analysis model DB can be more accurate when it performs the asymmetry judgment.

Afterwards, after the image analysis model DB is established, it is stored in the storage device 110. When the image analysis model DB is utilized, the processor 120 is configured to read the image analysis model DB from the storage device 110, the image analysis model DB is configured to determine whether the first difference image DiffImg1 and the second difference image DiffImg2 are symmetric to generate the symmetry result or the asymmetry result. In the embodiment, the breast image analysis method 300 executes step S360 to calculate an asymmetry region of one of the first difference image DiffImg1 and the second difference image DiffImg2, if one of the first difference image DiffImg1 and the second difference image DiffImg2 is asymmetric. As shown in FIG. 9, if the second difference image DiffImg2 is labeled as "1" by the image analysis model in step S350, the label result of the second difference image DiffImg2 is label "1". Therefore, the determining result is "asymmetry", so it is further performed to calculate the asymmetry region of the second difference image DiffImg2.

Figure 10:
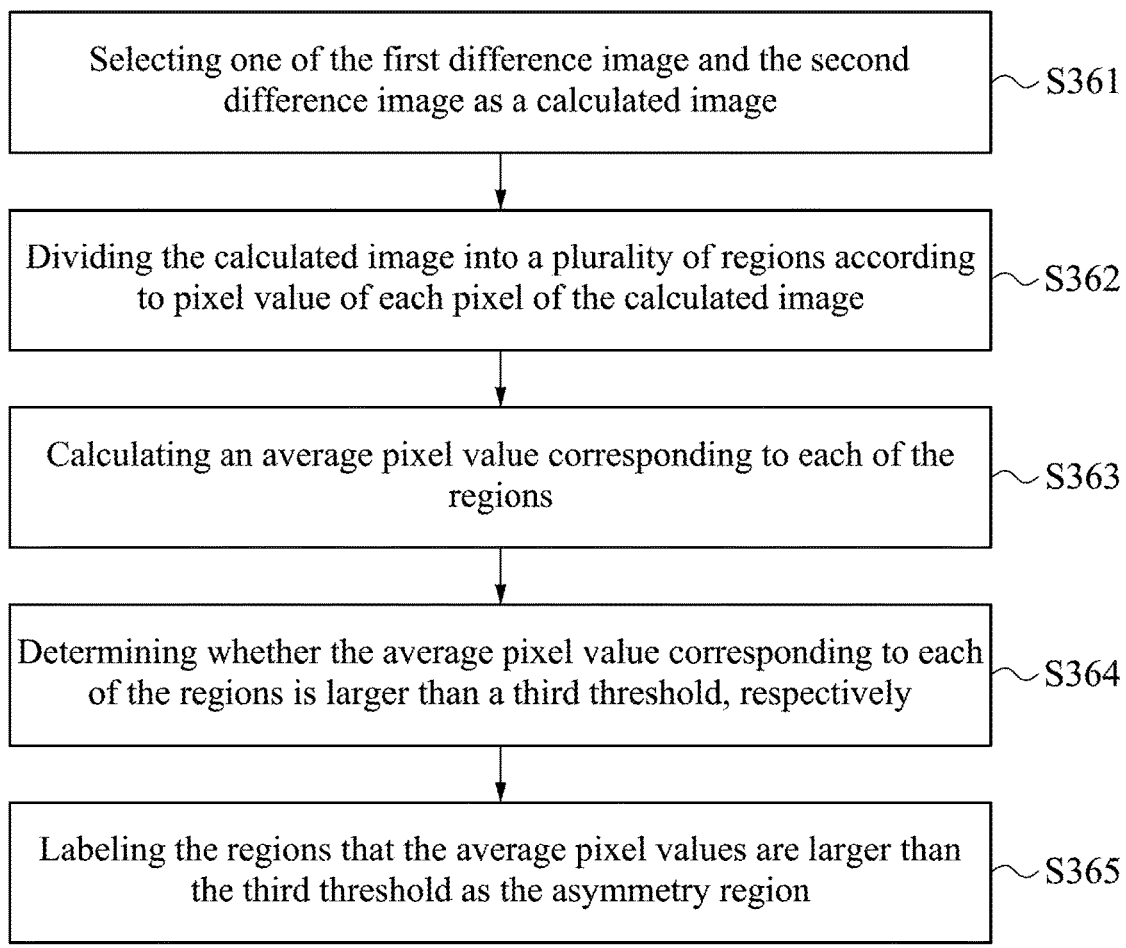
FIG. 10 is a flow diagram illustrating step S360 according to an embodiment of this disclosure.
Figure 11A:
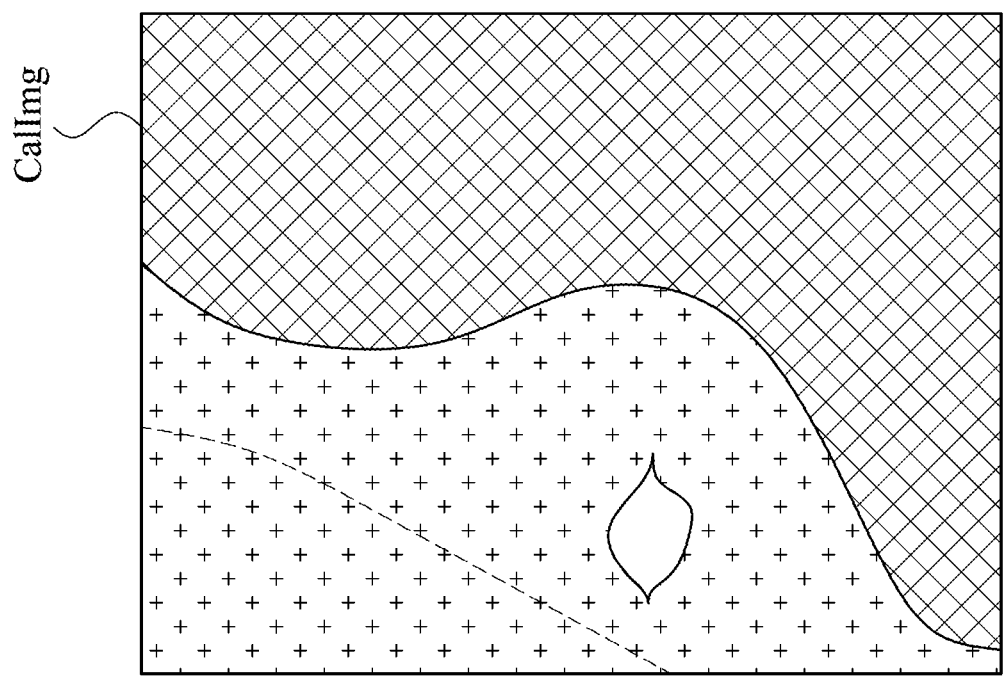
FIG. 11A is a schematic diagram illustrating the calculated image according to an embodiment of this disclosure.

Afterwards, the step S360 further includes steps S361~S365. Reference is made to FIG. 10 and FIG. 11A. FIG. 10 is a flow diagram illustrating step S360 according to an embodiment of this disclosure, and FIG. 11A is a schematic diagram illustrating the calculated image CalImg according to an embodiment of this disclosure. The breast image analysis method 300 executes step S361 to select one of the first difference image DiffImg1 and the second difference image DiffImg2 as a calculated image CalImg. In aforesaid embodiment, the calculated image CalImg is corresponding to aforesaid determining result, if the label result of the second difference image DiffImg2 is "asymmetry", the second difference image DiffImg2 is the calculated image CalImg.

Afterwards, the breast image analysis method 300 executes step S362 to divide the calculated image CalImg into a plurality of regions according to pixel value of each pixel of the calculated image CalImg. In the embodiment, it is utilized an image window to scan the calculated image CalImg, and to respectively determine whether the difference value between the pixel value of the central pixel in the image window and the pixel value of each adjacent pixel around the central pixel is less than a fourth threshold value. If the difference value is less than the fourth threshold, labeling the central pixel and the adjacent pixel corresponding to the difference value into same region. If the difference value is larger than the fourth threshold, labeling the central pixel and the adjacent pixel corresponding to the difference value into different region. For example, the size of the image window is 3 pixels*3 pixels, the size of the image window should not be limited thereto. The size of the image window also can be 5 pixels*5 pixels or 7 pixels*7 pixels. In the embodiment, the size of the image window is 3 pixels*3 pixels, if pixel value of the central pixel is 125, pixel value of eight adjacent pixel around the central pixel are {128, 125, 122, 120, 126, 129, 130, 125}. The difference value between pixel value of adjacent pixel and pixel value of the central pixel {125} is less than the fourth threshold value (the difference value is less than 6). Therefore, the nine pixel can be realized as same region. In this way, the calculated image CalImg can be divided into multiple regions according to the comparison result of pixel value between pixel value of each pixel and the adjacent pixel corresponding to each pixel.

Figure 11B:
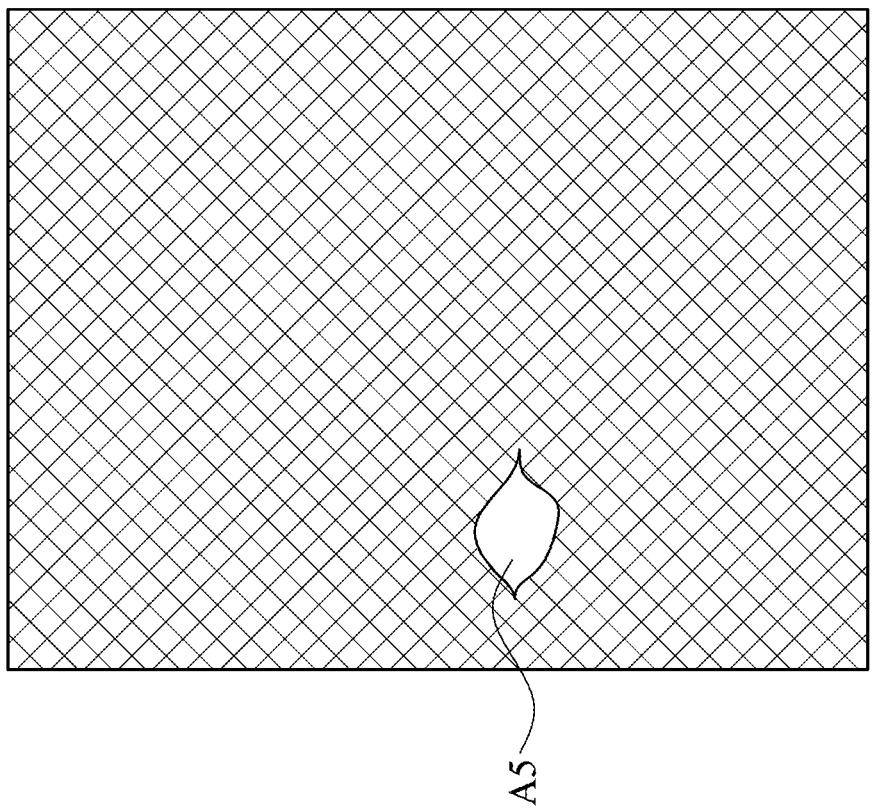
FIG. 11B is a schematic diagram illustrating the asymmetry region A5 according to an embodiment of this disclosure.

Afterwards, the breast image analysis method 300 executes step S363 to calculate an average pixel value corresponding to each of the regions; step S364 to determine whether the average pixel value corresponding to each of the regions is larger than a third threshold, respectively, and step S365 to label the regions that the average pixel values are larger than the third threshold as the asymmetry region. Reference is made to FIG. 11B, which is a schematic diagram illustrating the asymmetry region A5 according to an embodiment of this disclosure. Base on aforesaid embodiment, after dividing the calculated image CalImg into multiple regions, it is necessary to calculate the average pixel value of each region. After calculating the average pixel value, the regions with the lower average pixel value are filtered out by utilizing the third threshold, and the region A5 with the average pixel value greater than the third threshold value is left, Therefore, the region A5 is the asymmetry region.

Afterwards, the breast image analysis method 300 executes step S370 to generate an analysis report representing the symmetry result or the asymmetry result. In the embodiment, information that determines whether the paired breast images are asymmetric is key information in the Breast Imaging-Reporting And Data System (BI-RADS). Therefore, aforesaid determining result can be important information in the analysis report. Base on aforesaid embodiment, if the label result of the first breast image Img1 is label "0", the analysis report can be described as "symmetry". On the contrary, if the label result of the second breast image Img2 is label "1", the analysis report can be described as "asymmetry". The asymmetry condition is occurred in the second breast image Img2, the asymmetry region (the execution result of step S360) in the second breast image Img2 can be further described in the analysis report.

Based on aforesaid embodiments, breast image analysis method, breast image analysis system and non-transitory computer-readable medium are capable of extracting feature points of the paired breast images to calibrate the paired breast images; calculating the breast difference images of the breast paired images; inputting the breast difference image into classifier to train the image analysis model; and then determining whether the breast image is symmetric according the trained image analysis model, if the breast image is asymmetric, calculating an asymmetry region of the breast image. In some embodiments, this disclosure is able to determine automatically the breast image is asymmetric and detect the asymmetry region of the breast image.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A breast image analysis method, comprising:
    inputting a first breast image and a second breast image generated by Mammography;
    extracting a plurality of first feature points of the first breast image and a plurality of second feature points of the second breast image;
    calibrating the first breast image and the second breast image according to the first feature points and the second feature points to generate a first calibration image and a second calibration image;
    calculating a first difference image between the first breast image and the second calibration image and calculating a second difference image between the second breast image and the first calibration image;
    utilizing an image analysis model to respectively determine whether the first difference image and the second difference image are symmetric, wherein, when the first difference image and the second difference image are symmetric, to generate a symmetry result; when the first difference image and the second difference image are asymmetric, to generate an asymmetry result; and
    generating an analysis report representing the symmetry result or the asymmetry result, wherein calibrating the first breast image and the second breast image according to the first feature points and the second feature points, further comprising:
    establishing a positional correspondence between the first feature points and the second feature points;
    generating a first transfer matrix based on the first breast image and the positional correspondence, and generating a second transfer matrix based on the second breast image and the positional correspondence;
    converting the first breast image into the first calibration image according to the second transfer matrix, and converting the second breast image into the second calibration image according to the first transfer matrix; and
    adjusting brightness value of the second calibration image according to brightness value of the first breast image, and adjusting brightness value of the first calibration image according to brightness value of the second breast image.

2. The breast image analysis method of claim 1, further comprising:
    labeling the first difference image and the second difference, respectively, to generate a first label result and a second label result; and
    utilizing the first difference image, the second difference image, the first label result and the second label result as a training data, to generate the image analysis model.

3. The breast image analysis method of claim 1, wherein extracting the first feature points of the first breast image and the second feature points of the second breast image, further comprising:
    utilizing a first threshold to find a first edge of a first breast region, and utilizing the first threshold to find a second edge of a second breast region; wherein, the first edge comprises a plurality of first pixels, and the second edge comprises a plurality of second pixels;
    calculating curvatures of the first pixels and curvatures of the second pixels;
    determining whether curvatures of the first pixels and curvatures of the second pixels are larger than a second threshold, respectively; and
    labeling the first pixels that are larger than the second threshold as the first feature points, and labeling the second pixels that are larger than the second threshold as the second feature points.

4. The breast image analysis method of claim 1, wherein utilizing the image analysis model to respectively determine whether the first difference image and the second difference image are symmetric, further comprising:
    if it is determined that the first difference image and the second difference image are asymmetric, calculating an asymmetry region of one of the first difference image and the second difference image.

5. The breast image analysis method of claim 4, wherein calculating the asymmetry region, further comprising:

selecting one of the first difference image and the second difference image as a calculated image;
dividing the calculated image into a plurality of regions according to pixel value of each pixel of the calculated image;
calculating an average pixel value corresponding to each of the regions;
determining whether the average pixel value corresponding to each of the regions is larger than a third threshold, respectively; and
labeling the regions that the average pixel values are larger than the third threshold as the asymmetry region.

6. The breast image analysis method of claim 5, wherein dividing the calculated image into a plurality of regions according to pixel value of each pixel of the calculated image, further comprising:
utilizing an image window to scan the calculated image sequentially;
determining whether a difference value between pixel value of a central pixel in the image window and pixel value of each adjacent pixel around the central pixel is less than a fourth threshold, respectively;
if the difference value is less than the fourth threshold, labeling the central pixel and the adjacent pixel corresponding to the difference value into same region; and
if the difference value is larger than the fourth threshold, labeling the central pixel and the adjacent pixel corresponding to the difference value into different region.

7. A breast image analysis system, comprising:
a storage device, configured for storing a first breast image and a second breast image generated by Mammography; and
a processor, electrically connected to the storage device, the processor comprises:
a feature extraction unit using the processor, is configured for extracting a plurality of first feature points of the first breast image and a plurality of second feature points of the second breast image;
an image calibration unit using the processor is electrically connected to the feature extraction unit, and configured for calibrating the first breast image and the second breast image according to the first feature points and the second feature points to generate a first calibration image and a second calibration image;
a difference image generation unit using the processor is electrically connected to the image calibration unit, and configured for calculating a first difference image between the first breast image and the second calibration image and calculating a second difference image between the second breast image and the first calibration image;
a symmetry analyzation unit using the processor is electrically connected to the difference image generation unit, and configured for utilizing an image analysis model to respectively determine whether the first difference image and the second difference image are symmetric, wherein, when the first difference image and the second difference image are symmetric, to generate a symmetry result; when the first difference image and the second difference image are asymmetric, to generate an asymmetry result; and
a report generation unit using the processor, is electrically connected to the symmetry analyzation unit, and configured for generating an analysis report representing the symmetry result or the asymmetry result,
wherein the image calibration unit is further configured for executing following steps:

establishing a positional correspondence between the first feature points and the second feature points;
generating a first transfer matrix based on the first breast image and the positional correspondence, and generating a second transfer matrix based on the second breast image and the positional correspondence;
converting the first breast image into the first calibration image according to the second transfer matrix, and converting the second breast image into the second calibration image according to the first transfer matrix; and
adjusting brightness value of the second calibration image according to brightness value of the first breast image, and adjusting brightness value of the first calibration image according to brightness value of the second breast image.

8. The breast image analysis system of claim 7, further comprising:
an analysis model establishing unit using the processor, is electrically connected to the difference image generation unit, and configured for labeling the first difference image and the second difference, respectively, to generate a first label result and a second label result; and utilizing the first difference image, the second difference, the first label result and the second label result as a training data, to generate the image analysis model.

9. The breast image analysis system of claim 7, wherein the feature extraction unit is further configured for executing following steps:
utilizing a first threshold to find a first edge of a first breast region, and utilizing the first threshold to find a second edge of a second breast region; wherein, the first edge comprises a plurality of first pixels, and the second edge comprises a plurality of second pixels;
calculating curvatures of the first pixels and curvatures of the second pixels;
determining whether curvatures of the first pixels and curvatures of the second pixels are larger than a second threshold, respectively; and
labeling the first pixels that are larger than the second threshold as the first feature points, and labeling the second pixels that are larger than the second threshold as the second feature points.

10. The breast image analysis system of claim 7, wherein the symmetry analyzation unit is further configured for executing following steps:
if it is determined that the first difference image and the second difference image are asymmetric, calculating an asymmetry region of one of the first difference image and the second difference image.

11. The breast image analysis system of claim 10, wherein the symmetry analyzation unit is configured for calculating the asymmetry region, and further configured for executing following steps:
selecting one of the first difference image and the second difference image as a calculated image;
dividing the calculated image into a plurality of regions according to pixel value of each pixel of the calculated image;
calculating an average pixel value corresponding to each of the regions;
determining whether the average pixel value corresponding to each of the regions is larger than a third threshold, respectively; and
labeling the regions that the average pixel values are larger than the third threshold as the asymmetry region.

12. The breast image analysis system of claim 7, wherein the symmetry analyzation unit is configured for dividing the calculated image into the regions, and further configured for executing following steps:
- utilizing an image window to scan the calculated image sequentially;
- determining whether a difference value between pixel value of a central pixel in the image window and pixel value of each adjacent pixel around the central pixel is less than a fourth threshold, respectively;
- if the difference value is less than the fourth threshold, labeling the central pixel and the adjacent pixel corresponding to the difference value into same region; and
- if the difference value is larger than the fourth threshold, labeling the central pixel and the adjacent pixel corresponding to the difference value into different region.

13. A non-transitory computer-readable medium including one or more sequences of instructions to be executed by a processor for performing a breast image analysis method, wherein the method comprises:
- inputting a first breast image and a second breast image generated by Mammography;
- extracting a plurality of first feature points of the first breast image and a plurality of second feature points of the second breast image;
- calibrating the first breast image and the second breast image according to the first feature points and the second feature points to generate a first calibration image and a second calibration image;
- calculating a first difference image between the first breast image and the second calibration image and calculating a second difference image between the second breast image and the first calibration image;
- utilizing an image analysis model to respectively determine whether the first difference image and the second difference image are symmetric, wherein, when the first difference image and the second difference image are symmetric, to generate a symmetry result; when the first difference image and the second difference image are asymmetric, to generate an asymmetry result; and
- generating an analysis report representing the symmetry result or the asymmetry result, wherein calibrating the first breast image and the second breast image according to the first feature points and the second feature points, further comprising:
- establishing a positional correspondence between the first feature points and the second feature points;
- generating a first transfer matrix based on the first breast image and the positional correspondence, and generating a second transfer matrix based on the second breast image and the positional correspondence;
- converting the first breast image into the first calibration image according to the second transfer matrix, and converting the second breast image into the second calibration image according to the first transfer matrix; and
- adjusting brightness value of the second calibration image according to brightness value of the first breast image, and adjusting brightness value of the first calibration image according to brightness value of the second breast image.

* * * * *